United States Patent [19]

Shimizu et al.

[11] Patent Number: 5,279,116
[45] Date of Patent: Jan. 18, 1994

[54] DEVICE FOR DETERMINING DETERIORATION OF A CATALYTIC CONVERTER FOR AN ENGINE

[75] Inventors: Yasuhiro Shimizu, Aichi; Nobuyuki Kobayashi, Toyota, both of Japan

[73] Assignee: Toyota Jidosha Kabushiki Kaisha, Aichi, Japan

[21] Appl. No.: 957,041

[22] Filed: Oct. 6, 1992

[30] Foreign Application Priority Data

Dec. 16, 1991 [JP] Japan ................................ 3-331810

[51] Int. Cl.$^5$ ............................................. F01N 3/00
[52] U.S. Cl. .................................... 60/277; 60/274; 60/276; 60/285
[58] Field of Search .................. 60/274, 276, 277, 285

[56] References Cited

U.S. PATENT DOCUMENTS

| Re. 33,942 | 6/1992 | Katsuno et al. | 60/274 |
|---|---|---|---|
| 4,177,787 | 12/1979 | Hattori et al. | 60/274 |
| 4,739,614 | 4/1988 | Katsuno et al. | 60/274 |
| 4,817,383 | 4/1989 | Masui | 60/274 |
| 4,881,368 | 11/1989 | Demura et al. | 60/274 |
| 5,088,281 | 2/1992 | Izutani et al. | 60/274 |
| 5,119,628 | 6/1992 | Uema et al. | 60/274 |

FOREIGN PATENT DOCUMENTS

| 60-231155 | 11/1985 | Japan . |
|---|---|---|
| 61-185634 | 8/1986 | Japan . |
| 62-29711 | 2/1987 | Japan . |
| 63-97852 | 4/1988 | Japan . |
| 63-147941 | 6/1988 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |
| 3-57862 | 3/1991 | Japan . |
| 3-134241 | 6/1991 | Japan . |
| 3-286160 | 12/1991 | Japan . |

OTHER PUBLICATIONS

John W. Koupal et al, "Detection of Catalyst Failure On-Vehicle Using the Dual Oxygen Sensor Method," Jul. 31, 1991, pp. 135–146. (SAE Technical Paper Series 910561).

William B. Clemmens, et al., "Detection of Catalyst Performance Loss Using On-Board Diagnostics," Feb. 26–Mar. 2, 1990, pp. 1–18; International Congress and Exposition—Detroit, Mich. (SAE Technical Paper Series 900062).

Primary Examiner—Noah P. Kamen
Attorney, Agent, or Firm—Oliff & Berridge

[57] ABSTRACT

A device for determining a deterioration of a catalytic converter for an engine equipped with a catalytic converter disposed in the exhaust passage and upstream and downstream air-fuel ratio sensors disposed in the exhaust passage upstream and downstream of the catalytic converter, respectively, wherein the device calculates the lengths of the output response curves of the upstream and downstream air-fuel ratio sensors LVOM and LVOS, respectively, and the areas surrounded by the output response curves and a reference voltage line of the upstream and downstream air-fuel ratio sensors AVOM and AVOS, respectively, the device determining whether or not the catalyst is deteriorated in accordance with the relationship between the ratio LVOS/LVOM and the ratio AVOS/AVOM.

20 Claims, 17 Drawing Sheets

Fig.1

(WITH NORMAL CATALYST)  ○···NORMAL O₂ SENSOR   ×···DETERIORATED O₂ SENSOR

| | OUTPUT RESPONSE OF THE UPSTREAM O₂ SENSOR (VOM) | OUTPUT RESPONSE OF THE DOWNSTREAM O₂ SENSOR (VOS) | LVOS/LVOM | AVOS/AVOM |
|---|---|---|---|---|
| (1) | ○<br>LVOM : LARGE<br>AVOM : LARGE | ○<br>LVOS : SMALL<br>AVOS : LARGE | SMALL | LARGE |
| (2) | ○<br>LVOM : LARGE<br>AVOM : LARGE | ×<br>LVOS : SMALL<br>AVOS : MEDIUM | VERY SMALL | MEDIUM OR SMALL |
| (3) | ×<br>LVOM : SMALL<br>AVOM : SMALL | ○<br>LVOS : SMALL<br>AVOS : LARGE | MEDIUM | VERY LARGE |
| (4) | ×<br>LVOM : SMALL<br>AVOM : SMALL | ×<br>LVOS : SMALL<br>AVOS : MEDIUM | SMALL | LARGE |

Fig.2

(WITH DETERIORATED CATALYST)   ○···NORMAL $O_2$ SENSOR   ×···DETERIORATED $O_2$ SENSOR

| | OUTPUT RESPONSE OF THE UPSTREAM $O_2$ SENSOR (VOM) | OUTPUT RESPONSE OF THE DOWNSTREAM $O_2$ SENSOR (VOS) | LVOS/LVOM | AVOS/AVOM |
|---|---|---|---|---|
| (5) | ○ 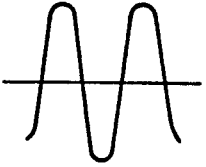<br>LVOM : LARGE<br>AVOM : LARGE | ○ 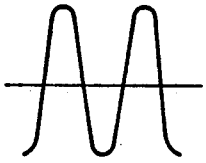<br>LVOS : LARGE<br>AVOS : LARGE | LARGE | MEDIUM OR LARGE |
| (6) | ○ 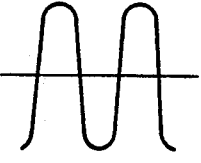<br>LVOM : LARGE<br>AVOM : LARGE | × 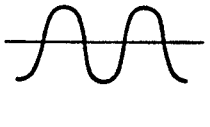<br>LVOS : MEDIUM<br>AVOS : SMALL | MEDIUM | SMALL |
| (7) | × 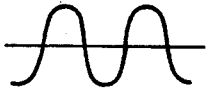<br>LVOM : SMALL<br>AVOM : SMALL | ○ 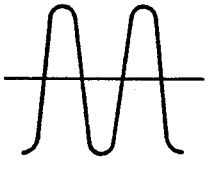<br>LVOS : LARGE<br>AVOS : LARGE | LARGE | LARGE |
| (8) | × 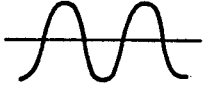<br>LVOM : SMALL<br>AVOM : SMALL | × 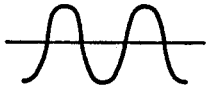<br>LVOS : MEDIUM<br>AVOS : SMALL | LARGE | MEDIUM OR LARGE |

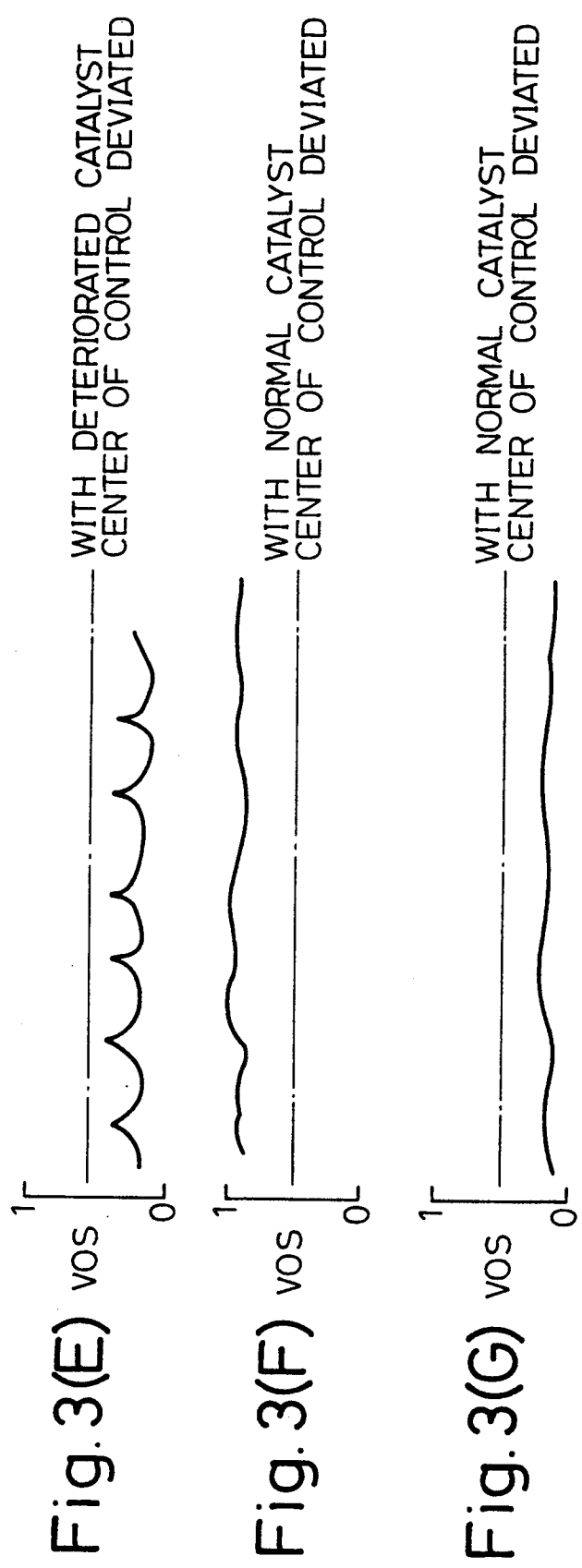

Fig. 7(C)

DEVICE FOR DETERMINING DETERIORATION OF A CATALYTIC CONVERTER FOR AN ENGINE

BACKGROUND OF THE INVENTION

1. Field of the Invention

The present invention relates to an air-fuel ratio control device for an engine which controls an air-fuel ratio of the engine based on at least an output of an air-fuel ratio sensor disposed in the exhaust passage upstream of a three-way catalyst. More specifically, the present invention relates to such an air-fuel ratio control device that is able to detect a deterioration of the three-way catalyst based on at least an output of an air-fuel ratio sensor disposed in the exhaust passage downstream of the three-way catalyst.

2. Description of the Related Art

An air-fuel ratio control device for controlling an air-fuel ratio of an engine by a feedback control based on an output of one air-fuel ratio sensor ($O_2$ sensor) disposed in an exhaust passage upstream of a catalytic converter is known as a single $O_2$ sensor system. The single $O_2$ sensor system is used for controlling the air-fuel ratio of the engine at a stoichiometric air-fuel ratio to improve the condition of the exhaust emissions by utilizing the ability of the three-way catalytic converter to a maximum degree.

Also, to compensate for the individual differences among cylinders or changes due to aging of the upstream $O_2$ sensor, a double $O_2$ sensor system using two $O_2$ sensors has been developed (U.S. Pat. No. 4,739,614). In the double $O_2$ sensor system, $O_2$ sensors are disposed upstream and downstream of the catalytic converter in the exhaust passage, and the air-fuel ratio control is carried out based on the output of the downstream $O_2$ sensor as well as the output of the upstream $O_2$ sensor.

Nevertheless, even in the double $O_2$ sensor system, if the catalyst in the catalytic converter is deteriorated, the condition of the exhaust emissions such as HC, CO, NOx is worsened, therefore it is necessary to detect the deterioration of the catalyst accurately.

To detect the deterioration of the catalyst in the catalytic converter, various methods or devices have been proposed For example, in the system disclosed in U.S. Pat. No. 4,739,614, it is determined that the catalyst is deteriorated, when the ratio of the period $T_1$ of the reversal of the output of the upstream $O_2$ sensor to the period $T_2$ of the reversal of the output of the downstream $O_2$ sensor, i.e., $T_1/T_2$, becomes larger than a predetermined value (or, alternatively, when the amplitude of the output of the downstream $O_2$ sensor becomes larger than a predetermined value). However, in the above system, if the center value of the air-fuel ratio controlled by the air-fuel ratio feedback control deviates from the stoichiometric air-fuel ratio, the reversal of the output of the downstream $O_2$ sensor does not occur. In this case, the output of the downstream $O_2$ sensor oscillates at a small amplitude at a rich side or lean side of the air-fuel ratio.

Also, in some cases, the amplitude of the output of the downstream $O_2$ sensor can become large even if the catalyst is not deteriorated. Further, if the downstream $O_2$ sensor itself is deteriorated, the amplitude of the output of the downstream $O_2$ sensor becomes smaller even if the air-fuel ratio of the exhaust gas downstream of the catalytic converter fluctuates largely.

Therefore, it is sometimes difficult to detect the deterioration of the catalyst accurately based on the period of the reversal or the amplitudes of the output of the $O_2$ sensors.

SUMMARY OF THE INVENTION

In view of the problems of the related art, the object of the present invention is to provide a device for determining a deterioration of a catalytic converter which can detect the deterioration of the catalytic converter used in the double $O_2$ sensor system accurately and regardless of the deterioration of the $O_2$ sensors.

According to the present invention, there is provided a device for determining a deterioration of a three-way catalyst disposed in an exhaust passage of an internal combustion engine equipped with an upstream air-fuel ratio sensor disposed in the exhaust passage upstream of the three-way catalyst, a downstream air-fuel ratio sensor disposed in the exhaust passage downstream of the three way catalyst, and a feedback control means for controlling the air-fuel ratio of the engine by a feedback control based on at least the output of the upstream air-fuel ratio sensor.

The device comprises a first characteristic value detecting means for detecting first characteristic values of the outputs of the upstream and downstream air-fuel ratio sensors when the engine is controlled by the feedback control means, a second characteristic value detecting means for detecting second characteristic values of the outputs of the upstream and downstream air-fuel ratio sensors when the engine is controlled by the feedback control means, and a determining means for determining whether or not the three-way catalyst has deteriorated by comparing the first characteristic values and the second characteristic values.

BRIEF DESCRIPTION OF THE DRAWINGS

The present invention will be better understood from the description as set forth hereinafter, with reference to the accompanying drawings, in which:

FIG. 1 is a drawing explaining typical changes in output response curves of the upstream and downstream $O_2$ sensors caused by the deterioration of the $O_2$ sensors under normal catalyst conditions;

FIG. 2 is a drawing similar to FIG. 1, but under deteriorated catalyst conditions;

FIGS. 3A-3G show the change in output response curve of the downstream $O_2$ sensor caused by the deterioration of the catalyst in various states;

FIGS. 7A-7D show a timing diagram explaining the flow chart of FIGS. 6A and 6B;

DESCRIPTION OF THE PREFERRED EMBODIMENT

FIGS. 1 through 4 schematically illustrate the principle of the method for detecting the deterioration of the three-way catalyst according to an embodiment of the present invention.

As explained later in detail, the detection of the deterioration of the catalyst is carried out based on two characteristic values of the output response curves of the upstream and downstream $O_2$ sensors, i.e., the lengths of the output response curves and the area surrounded by the output response curves and reference value lines of the $O_2$ sensors.

Figure 3A:
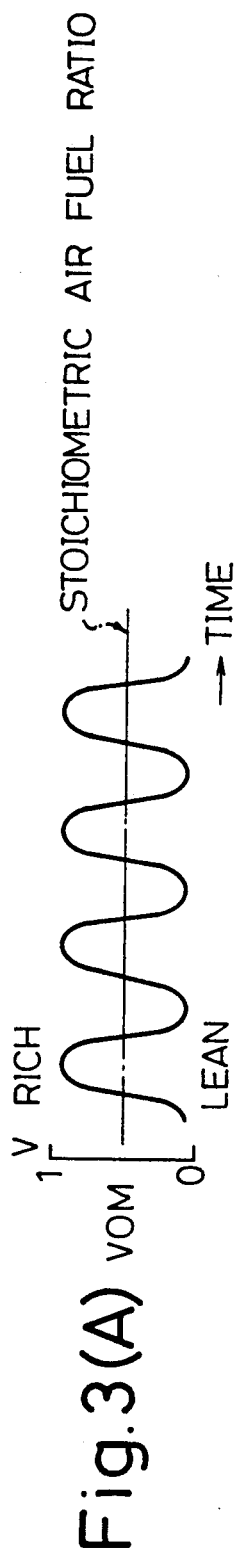
Figure 3B:
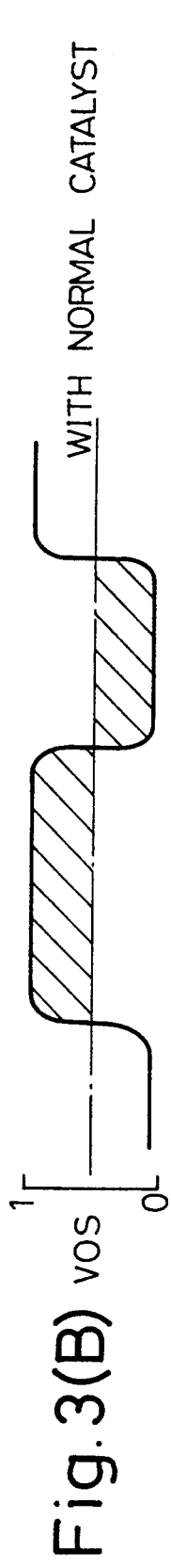
Figure 3C:
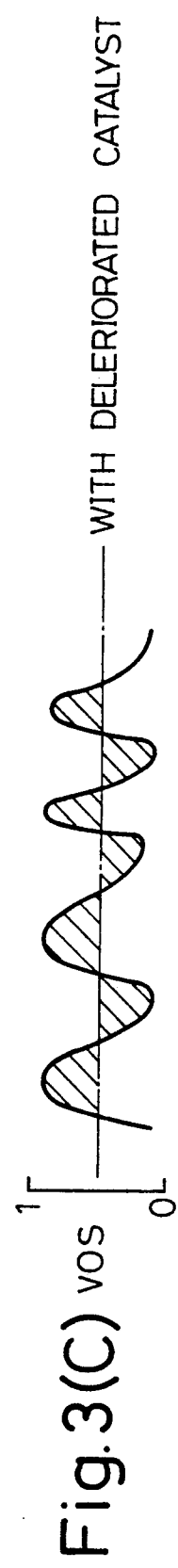
Figure 3D:
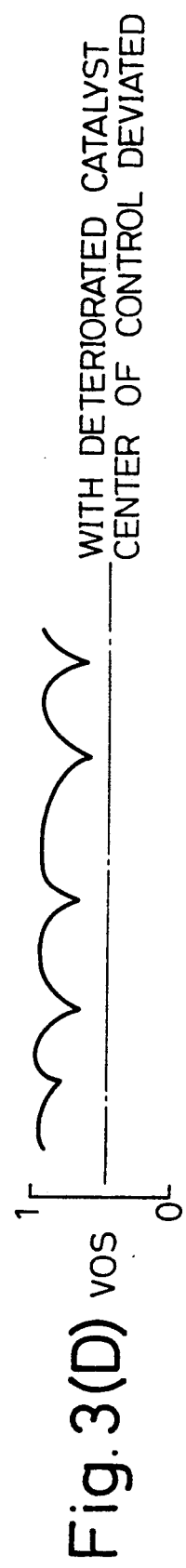

FIG. 3 shows output response curves of the upstream and downstream $O_2$ sensors when the air-fuel ratio of the engine is feedback controlled FIG. 3(A) shows the response curve of the output VOM of the upstream $O_2$ sensor. As seen from FIG. 3(A), the output of the upstream $O_2$ sensor oscillates regularly between the lean side and rich side when the air-fuel ratio of the engine is feedback controlled.

FIGS. 3(B) through (G) show the response curves of the output VOS of the downstream $O_2$ sensor, and (C) through (E) show the case in which the catalyst has deteriorated, (B), (F) and (C) show the case in which the catalyst is normal. Also, in the cases (B) and (C), the air-fuel ratio of the engine is controlled so that the central value of the oscillation of the air-fuel ratio of the engine coincides with the stoichiometric air-fuel ratio. On the contrary, in the cases (D) through (G), the central value of the oscillation of the air-fuel ratio of the engine is deviated largely from the stoichiometric air-fuel ratio. Cases (D) to (G) occur, for example, when the upstream $O_2$ sensor is affected by certain cylinder. As seen from FIG. 3(C), (D), (E), (F), if the catalyst has deteriorated, the period of the oscillation of the output of the downstream $O_2$ sensor becomes shorter compared with those of FIG. 3 (B), (F), (C) in which the catalyst has not deteriorated, regardless of the central value of the feedback control. Accordingly, if the catalyst has deteriorated, the length LVOS of the response curve of the output VOS increases. Therefore, it is possible, to some extent, to detect the deterioration of the catalyst using a parameter such as LVOS/LVOM (where LVOM represents the length of the response curve of the output VOM of the upstream $O_2$ sensor). In this case, it is determined that the catalyst has deteriorated when the value LVOS/LVOM becomes larger than a predetermined value.

Figure 4A:
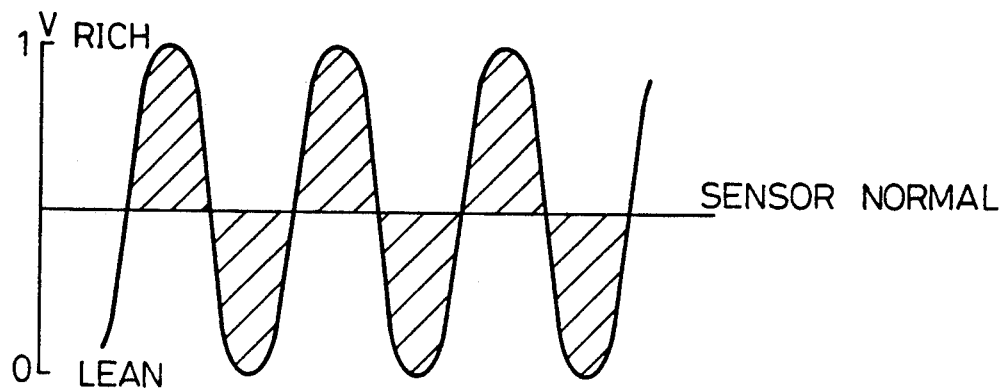
FIGS. 4A-4C show the change in output response curve of the $O_2$ sensor caused by the deterioration of the $O_2$ sensor in various states.
Figure 4B:
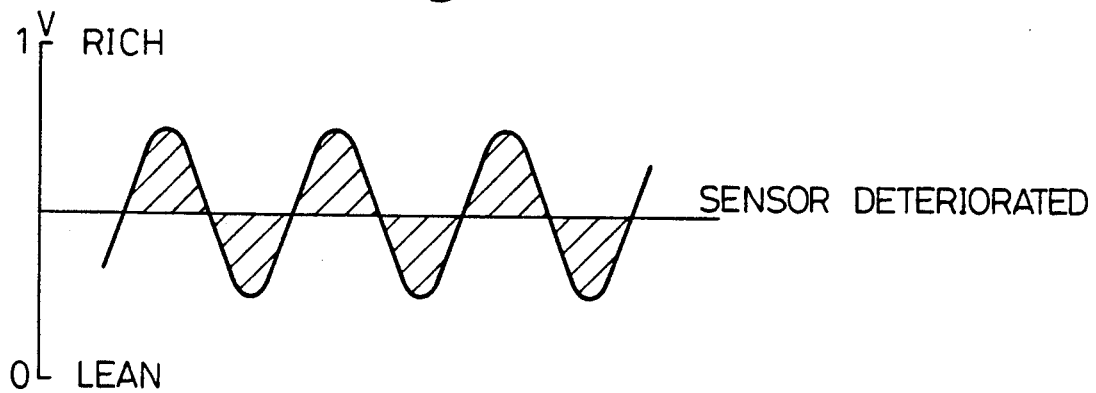
Figure 4C:
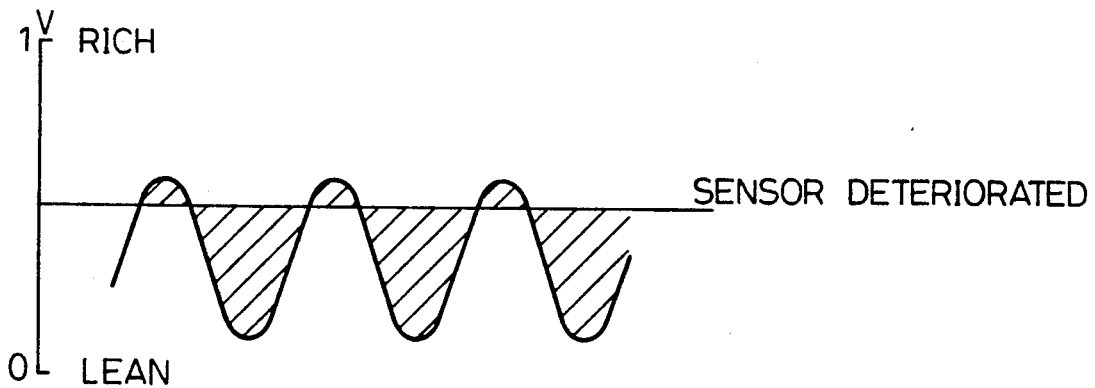

However, if the deterioration of the catalyst is determined by the lengths of the output response curve of $O_2$ sensors only, in some cases it is difficult to determine the deterioration of the catalyst accurately. For example, FIGS. 4(A) through (C) show the change in the output response of the $O_2$ sensor due to the deterioration of the $O_2$ sensor itself FIG. 4(A) shows conditions, and FIGS. 4(B) and (C) show the response curve of the $O_2$ sensor after deterioration. When the $O_2$ sensor is deteriorated, the amplitude of the output response curve becomes smaller (FIG. 4 (B), (C)) compared with the amplitude under normal conditions (FIG. 4 (A)). Thereby, the length of the output response curve (LVOS or LVOM) also becomes smaller when the $O_2$ sensor has deteriorated. Therefore, if the upstream $O_2$ sensor has deteriorated, the value LVOS/LVOM becomes large even though the catalyst has not deteriorated, and if the downstream $O_2$ sensor has deteriorated, the value LVOS/LVOM remains small even though the catalyst has deteriorated.

In this embodiment, determination of the deterioration of the catalyst is carried out using the area surrounded by the output response curve and the reference value line in addition to the length of the output response curve. As seen from FIGS. 3(B) and (C), the area surrounded by the output response curve of the downstream $O_2$ sensor (indicated by a hatched area in FIGS. 3(B) and (C)), becomes smaller when the catalyst has deteriorated.

Also, as seen from FIGS. 4(A) to (C), said area becomes smaller when the $O_2$ sensor is deteriorated. Therefore, by using the value AVOS/AVOM in addition to the value LVOS/LVOM, the deterioration of the catalyst can be detected accurately regardless of the deterioration of the $O_2$ sensors (where, AVOS represents the area surrounded by the output response curve (VOM) of the upstream $O_2$ sensor, and AVOS represents the area surrounded by the output response curve (VOS) of the downstream $O_2$ sensor.).

FIGS. 1 and 2 show the change in the value LVOS/LVOM and AVOS/AVOM in accordance with the deterioration of the upstream $O_2$ sensor and downstream $O_2$ sensor when the catalyst is normal (FIG. 1) and when the catalyst has deteriorated (FIG. 2). In FIGS. 1 and 2, the columns with an o mark indicate the output response curves of $O_2$ sensors in normal condition, and the columns with an x mark indicate the output response curves of deteriorated $O_2$ sensors. As seen from FIGS. 1 and 2, the output responses of the upstream and downstream sensors are changed as stated below in accordance with the deterioration of the catalyst and $O_2$ sensors.

1. Upstream $O_2$ sensor (VOM)
    (1) If the upstream $O_2$ sensor is not deteriorated, both the length LVOM and the area AVOM are large regardless of the deterioration of the catalyst. (FIG. 1(1), (2), and FIG. 2(5), (6)).
    (2) If the upstream $O_2$ sensor has deteriorated, both the length LVOM and the area AVOM are small regardless of the deterioration of the catalyst. (FIG. 1(3), (4), and FIG. 2(7), (8)).
2. Downstream $O_2$ sensor (VOS)
    (1) If the catalyst is not deteriorated;
        1 The length LVOS is small regardless of the deterioration of the downstream $O_2$ sensor (FIG. 1(1)–(4)).
        2 The area AVOS is large when the downstream $O_2$ sensor is not deteriorated (FIG. 1(1), (3)), and is medium when the downstream $O_2$ sensor has deteriorated (FIG. 1(2), (4)).
    (2) If the catalyst is deteriorated;
        1 Both of the length LVOS and the area AVOS are large when the downstream $O_2$ sensor is not deteriorated (FIG. 2(5), (7)).
        2 The length LVOS is medium and the area AVOS is small when the downstream $O_2$ sensor has deteriorated (FIG. 2(6), (8)).

Accordingly, the ratio of the length LVOS/LVOM and the ratio of the area AVOS/AVOM take the values as shown in the right side columns of FIGS. 1 and 2. Note that if the deterioration of the catalyst is determined by the parameter LVOS/LVOM only, it is difficult to determine the deterioration of the catalyst in the cases of FIGS. 1(3) and FIG. 2(6) since the values of LVOS/LVOM are nearly the same for these cases in spite of the difference of the presence of the deterioration of the catalyst. However, even in these cases, the value of the ratio AVOS/AVOM is very large when the catalyst is not deteriorated (FIG. 1(3)) and is small when the catalyst has deteriorated (FIG. 2(6)). Therefore, by using parameters LVOS/LVOM and AVOS/AVOM, the deterioration of the catalyst is determined accurately even in these cases.

In the embodiment explained below, the deterioration of the catalyst is determined by the parameters LVOS/LVOM and AVOS/AVOM based on the relationships shown in FIGS. 1 and 2.

Figure 5:
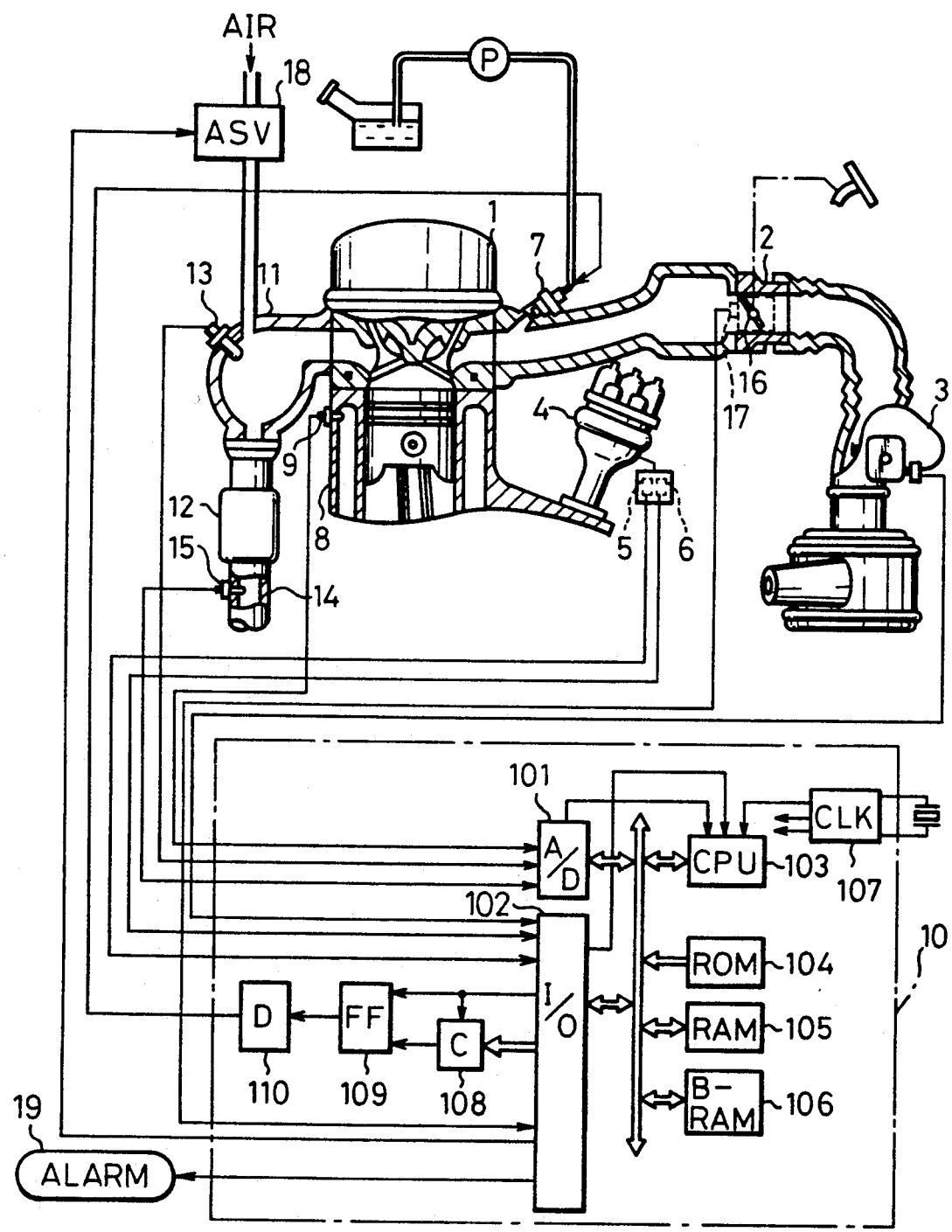
FIG. 5 is a schematic view of an internal combustion engine showing an embodiment of the present invention.

FIG. 5 schematically illustrates an embodiment of the device for determining the deterioration of the catalyst for carrying out the determination method explained above.

In FIG. 5, reference numeral 1 represents an internal combustion engine for an automobile. An air-intake passage 2 of the engine 1 is provided with a potentiometer-type airflow meter 3 for detecting an amount of air drawn into the engine 1, and generates an analog voltage signal proportional to the amount of air flowing therethrough. The signal from the air-flow meter 3 is transmitted to a multiplexer-incorporating analog-to-digital (A/D) converter 101 of the control circuit 10.

Crankangle sensors 5 and 6, for detecting the angle of the crankshaft (not shown) of the engine 1, are disposed at a distributor 4.

In this embodiment, the crankangle sensor 5 generates a pulse signal at every 720° C. crankangle (CA) and the crankangle sensor 6 generates a pulse signal at every 30° CA. The pulse signals from the crankangle sensors 5 and 6 are supplied to an input/output (I/O) interface 102 of the control circuit 10. Further, the pulse signal of the crankangle sensor 6 is then supplied to an interruption terminal of a central processing unit (CPU) 103.

In the air intake passage 2, a fuel injection valve 7 is provided at an inlet port of each cylinder of the engine 1, for supplying pressurized fuel from the fuel system to the cylinders of the engine.

A coolant temperature sensor 9 for detecting the temperature of the coolant is disposed in a water jacket of a cylinder block 8 of the engine 1. The coolant temperature sensor 9 generates an analog voltage signal in response to the temperature THW of the coolant, and transmits this signal to the A/D converter 101 of the control circuit 10.

In the exhaust system, a three-way reducing and oxidizing catalytic converter 12 is disposed in the exhaust passage downstream of the exhaust manifold 11. The catalytic converter 12 is able to remove three pollutants in the exhaust gas, i.e., CO, HC and $NO_x$, simultaneously.

An upstream $O_2$ sensor 13 is provided at the exhaust manifold 11, i.e., upstream of the catalytic converter 12.

A downstream $O_2$ sensor 15 is disposed at an exhaust pipe 14 downstream of the catalytic converter 12.

The upstream $O_2$ sensor 13 and the downstream $O_2$ sensor 15 generate output signals corresponding to the concentration of the oxygen component in the exhaust gas.

More specifically, the $O_2$ sensors 13 and 15 generate output voltage signals which are changed in accordance with whether the air-fuel ratio of the exhaust gas is rich or lean, compared with the stoichiometric air-fuel ratio. The signals output by the $O_2$ sensors 13 and 15 are transmitted to the AD converter 101 of the control circuit 10.

The control circuit 10, which may be constructed by a microcomputer, further comprises a central processing unit (CPU) 103, a read-only-memory (ROM) 104 for storing a main routine and interrupt routines such as a fuel injection routine, an ignition timing routine and constants, etc., a random-access-memory 105 (RAM) for storing temporary data, a backup RAM 106, and a clock generator 107 for generating various clock signals. The back up RAM 106 is directly connected to a battery (not shown), and therefore, the content of the back up RAM 106 is preserved even when the ignition switch (not shown) is turned off.

A throttle valve 16 operated by a vehicle driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

Reference 18 designates a secondary air supply valve for introducing secondary air to the exhaust manifold 11 to thereby reduce the emission of HC and CO during a deceleration or idling operation of the engine.

Reference 19 designates an alarm which is activated when it is determined that the catalytic converter 12 has deteriorated.

A down counter 108, a flip-flop 109, and a drive circuit 110 are provided in the control circuit 10 for controlling the fuel injection valve 7.

When a fuel injection amount TAU is calculated in a routine, as explained later, the amount TAU is preset in the down counter 108, and simultaneously, the flip-flop 109 is set, and as a result, the drive circuit 110 initiates the activation of the fuel injection valve 7. On the other hand, the down counter 108 counts up the clock signal from the clock generator 107, and finally, a logic "1" signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crankangle sensor 6 generates a pulse signal; and when the clock generator 107 generates a special clock signal.

The intake air amount data Q from the airflow meter 3 and the coolant temperature data THW from the coolant sensor 9 are fetched by an A/D conversion routine(s) executed at predetermined intervals, and then stored in the RAM 105; i.e., the data Q and THW in RAM 105 are renewed at predetermined intervals. The engine speed $N_e$ is calculated by an interrupt routine executed at 30° CA, i.e., at every pulse signal of the crankangle sensor 6, and is stored in the RAM 105.

The operation of the control circuit 10 of FIG. 5 is now explained.

Figure 6A:
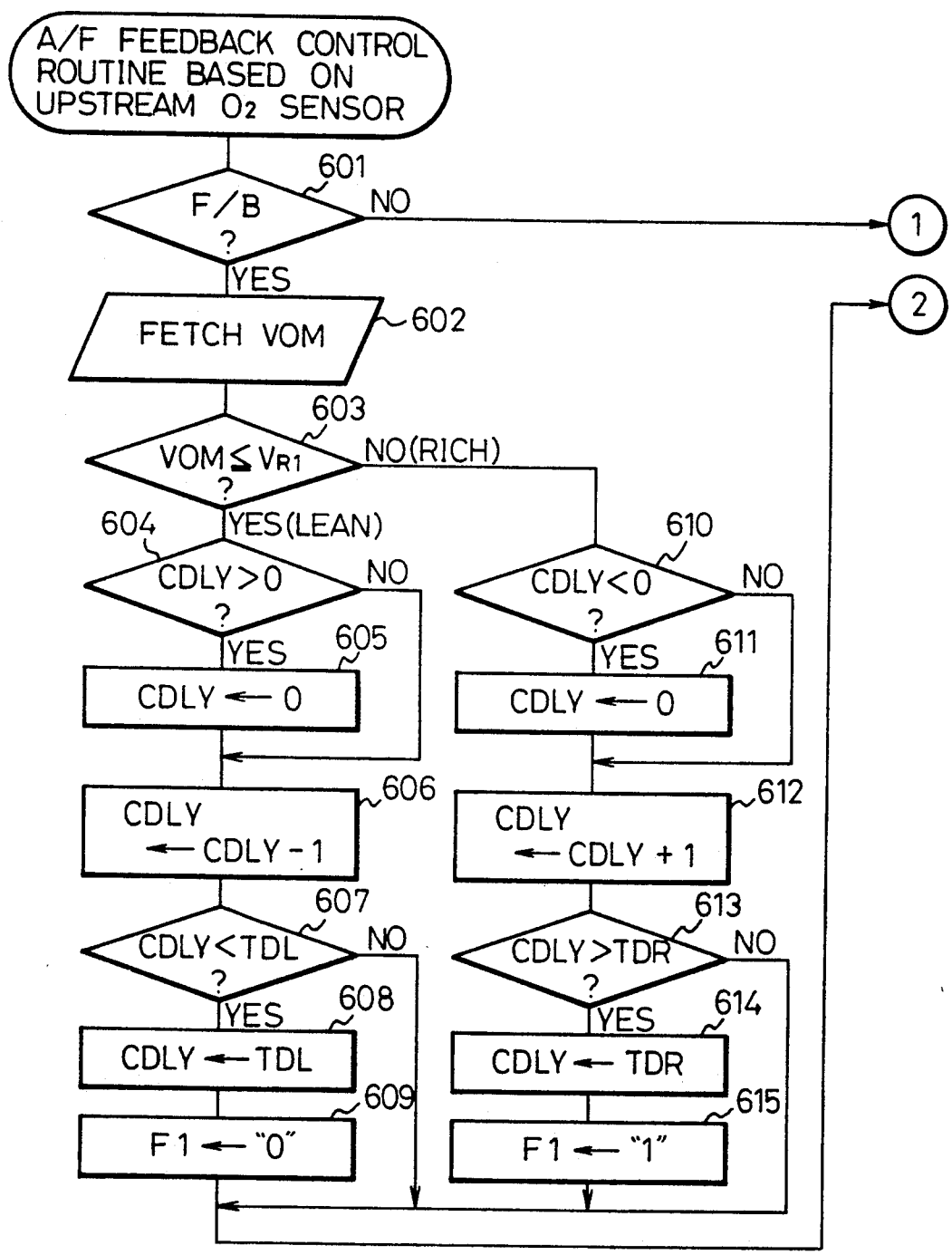
FIGS. 6A, 6B, 8A, 8B, 9 and 10A through 10C are flow charts showing the operations of the control circuit in FIG. 5.
Figure 6B:
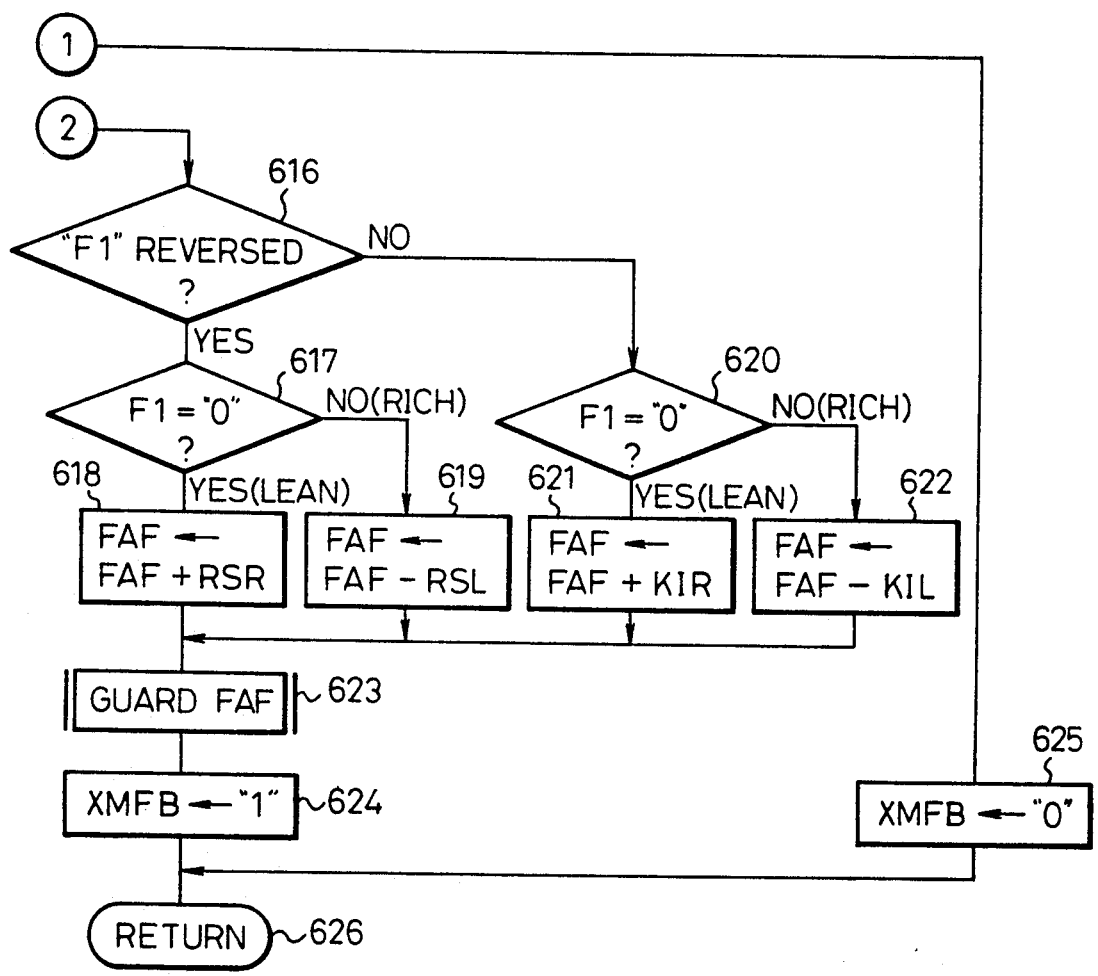

FIGS. 6A and 6B show a routine for a feedback control of the air-fuel ratio. This routine calculates an air-fuel ratio correction factor FAF in accordance with the output VOM of the upstream $O_2$ sensor 13, and is executed at predetermined intervals of, e.g., 4 ms.

At step 601 in FIG. 6A, it is determined whether or not all conditions for air-fuel ratio feedback control are satisfied. The conditions for a feedback control are, for example, the engine is not being started, the coolant temperature is higher than a predetermined value, the fuel increments, such as a start-up fuel increment, a warming-up fuel increment, a power fuel increment, or an OTP fuel increment for preventing an excess rise in the temperature of the catalytic converters, are not being carried out, the outputs of the upstream $O_2$ sensor 13 has been reversed (i.e., changed from a rich air-fuel ratio output signal to a lean air-fuel ratio output signal or vice versa) at least once, a fuel cut operation is not being carried out.

If any one of these conditions is not satisfied, the routine proceeds to step 625 in FIG. 6B which causes an air-fuel ratio feedback control flag XMFB to be "0" and the routine terminates at step 626 in FIG. 6B.

If all of the conditions for air-fuel ratio feedback control are satisfied at step 601, the routine proceeds to step 602.

At step 602, an A/D conversion is performed upon the output voltage VOM of the upstream $O_2$ sensor 13, and the A/D converted value thereof is then fetched from the A/D converter 101. Then, at step 603, the voltage VOM is compared with a reference voltage $V_{R1}$ to thereby determine whether the current air-fuel ratio detected by the upstream $O_2$ sensor 13 is on the rich side or on the lean side with respect to the stoichiometric air-fuel ratio. The reference voltage $V_{R1}$ is usually set at or near the central value of the maximum amplitude of the output of the $O_2$ sensor and, in this embodiment, $V_{R1}$ is set at 0.45 V.

If $VOM \leq V_{R1}$, which means that the current air-fuel ratio is lean, the control proceeds to step 604, at which it is determined whether or not the value of a delay counter CDLY is positive If CDLY>0, the control CDLY, and then proceeds to step 606. If CDLY≦0, the control proceeds directly to step 606. At step 606, the delay counter CDLY is counted down by 1, and at step 607, it is determined whether or not CDLY<TDL. Note that TDL is a lean delay time for which a rich state is maintained even after the output of the upstream $O_2$ sensor 13 is changed from the rich side to the lean side, and is defined by a negative value. Therefore, at step 607, only when CDLY<TDL does the control proceed to step 608, which causes CDLY to be TDL, and then to step 609, which causes an air-fuel ratio flag F1 to be "0" (lean state). On the other hand, if $VOM > V_{R1}$, which means that the current air-fuel ratio is rich, the control proceeds to step 610, which determines whether or not the value of the delay counter CDLY is negative. If CDLY<0, the control proceeds to step 611, which clears the delay counter CDLY, and then proceeds to step 612. If CDLY≧0, the control directly proceeds to 612. At step 612, the delay counter CDLY is counted up by 1, and at step 613, it is determined whether or not CDLY>TDR. Note that TDR is a rich delay time for which a lean state is maintained even after the output of the upstream $O_2$ sensor 13 is changed from the lean side to the rich side, and is defined by a positive value. Therefore, at step 613, only when CDLY>TDR does the control proceed to step 614, which causes CDLY to be TDR, and then to step 615, which causes the air-fuel ratio flag F1 to be "1" (rich state).

Next, at step 616 in FIG. 6B, it is determined whether or not the air-fuel ratio flag F1 is reversed, i.e., whether or not the delayed air-fuel ratio detected by the upstream $O_2$ sensor 13 is reversed. If the air-fuel ratio flag F1 is reversed, the control proceeds to steps 617 to 619, which carry out a skip operation. That is, if the flag F1 is "0" (lean) at step 617, the control proceeds to step 618, which remarkably increases the correction factor FAF by a skip amount RSR. Also, if the flag F1 is "1" (rich) at step 617, the control proceeds to step 619, which remarkably reduces the correction factor FAF by the skip amount RSL. On the other hand, if the air-fuel ratio flag F1 is not reversed at step 616, the control proceeds to steps 620 to 622, which carry out an integration operation. That is, if the flag F1 is "0" (lean) at step 620, the control proceeds to step 621, which gradually increases the correction factor FAF by a rich integration amount KIR. Also, if the flag F1 is "1" (rich) at step 620, the control proceeds to step 622, which gradually reduces the correction factor FAF by a lean integration amount KIL.

Then, at step 623, the air-fuel ratio correction factor FAF is guarded, for example, by a minimum value of 0.8 and by a maximum value of 1.2, to thereby prevent the controlled air-fuel ratio from becoming overrich or overlean.

The correction factor FAF is then stored in the RAM 105 and the routine proceeds to step 624, which causes the air-fuel ratio feedback control flag XMFB to be "1", and then the routine terminates at step 626.

Figure 7A:
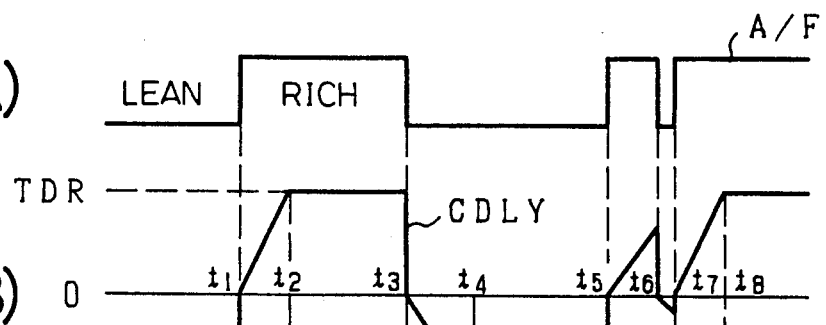
Figure 7B:
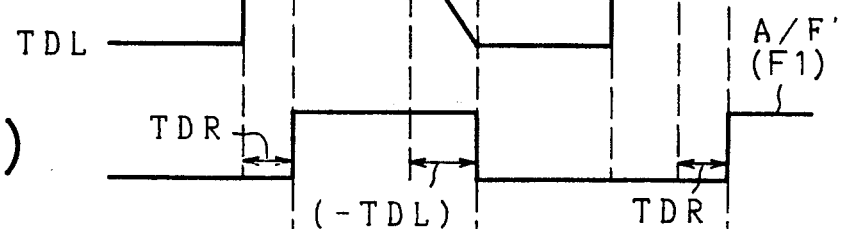
Figure 7D:
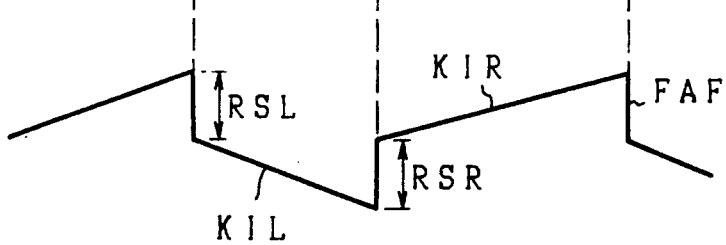

The control operation by the flow charts of FIGS. 6A and 6B are further explained with reference to FIGS. 7, (A) through (D). As illustrated in FIG. 7(A), when the air-fuel ratio A/F is obtained by the output of the upstream $O_2$ sensor 13, the delay counter CDLY is counted up during a rich state, and is counted down during a lean state, as illustrated in (B). As a result, a delayed air-fuel ratio corresponding to the air-fuel ratio flag F1 is obtained as illustrated in (C). For example, at time $t_1$, even when the air-fuel ratio A/F is changed ratio F1 is changed at time $t_2$ after the rich delay time TDR. Similarly, at time $t_3$, even when the air-fuel ratio A/F is changed from the rich side to the lean side, the delayed air-fuel ratio A/F, (F1) is changed at time $t_4$ after the lean delay time TDL. At time $t_5$, $t_6$, or $t_7$, however, when the air-fuel ratio A/F is reversed in a shorter time than the rich delay time TDR or the lean delay time TDL, the delayed air fuel ratio F1 is reversed at time $t_8$. That is, the delayed air-fuel ratio A/F' (F1) is stable when compared with the air-fuel ratio A/F. Further, as illustrated in (D), at every change of the delayed air-fuel ratio F1 from the rich side to the lean side, or vice versa, the correction factor FAF is skipped by the skip amount RSR or RSL, and the correction factor FAF is gradually increased or reduced in accordance with the delayed air-fuel ratio F1.

Next, the air-fuel ratio feedback control of the double $O_2$ sensor system in which the air-fuel ratio is controlled based on the output of the downstream $O_2$ sensor 15 as well as the output of the upstream $O_2$ sensor 13, is explained.

Generally, three types of air-fuel ratio feedback control operations by the downstream $O_2$ sensor 15 are used, i.e., the operation type in which one or more of the parameters such as the skip amounts RSR, RSL, integration amount KIR, KIL and delay times TDR, TDL are variable, and the operation type in which the reference voltage $V_{R1}$ of the outputs VOM of the upstream $O_2$ sensor is variable, or, the operation type in which a second air-fuel ratio correction factor FAF2 calculated in accordance with the output of the downstream $O_2$ sensor 15 is introduced.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream O$_2$ sensor 15. Further, if the rich integration amount KIR is increased or if the lean integration amount KIL is decreased, the controlled air-fuel ratio becomes richer, and if the lean integration amount KIL is increased or if the rich integration amount KIL is decreased, the controlled air-fuel ratio becomes leaner. Thus, the air-fuel ratio can be controlled by changing the rich integration amount KIR and the lean integration amount KIL in accordance with the output of the downstream O$_2$ sensor 15. Further, if the reference voltage V$_{R1}$ is increased, the controlled air-fuel ratio becomes richer, and if the reference voltage V$_{R1}$ is decreased, the controlled air-fuel ratio becomes leaner. Thus, the air-fuel ratio can be controlled by changing the reference voltage V$_{R1}$ in accordance with the output of the downstream O$_2$ sensor 15.

Also, if the rich delay time becomes longer than the lean delay time (TDR > TDL), the controlled air-fuel ratio becomes richer, and if the lean delay time becomes longer than the rich delay time (TDL > TDR), the controlled air-fuel ratio becomes leaner. Thus the air-fuel ratio can be controlled by changing the rich delay time period TDR and the lean delay time period TDL in accordance with the output of the downstream O$_2$ sensor 15.

These types of operations of the air-fuel ratio have respective advantages. For example, if the delay times TDR, TDL are variable, a precise control of the air-fuel ratio can be obtained, and if the skip amounts RSR, RSL are variable the response of the control is improved. Naturally, two or more of these operation types can be used at the same time.

Figure 8A:
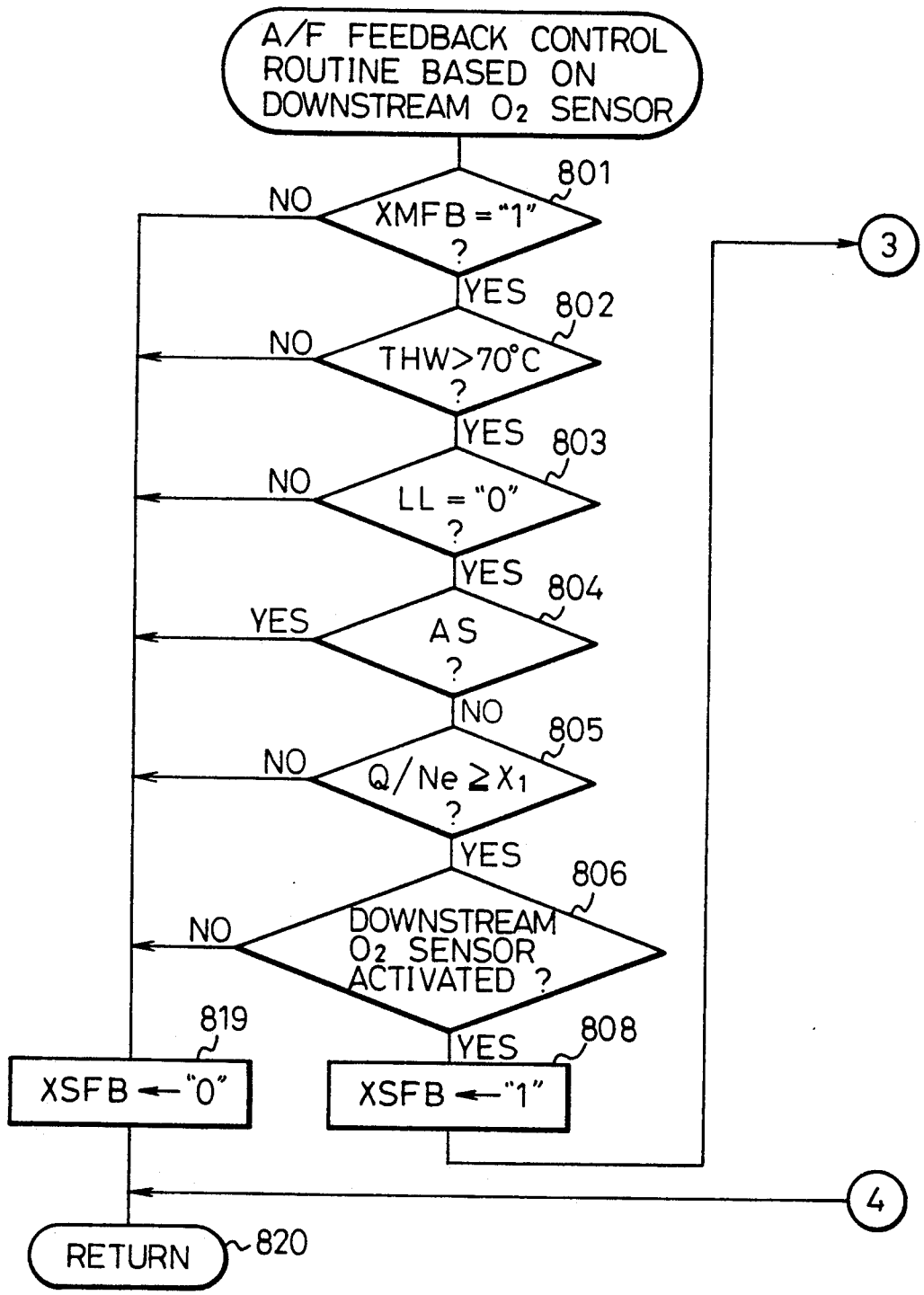
Figure 8B:
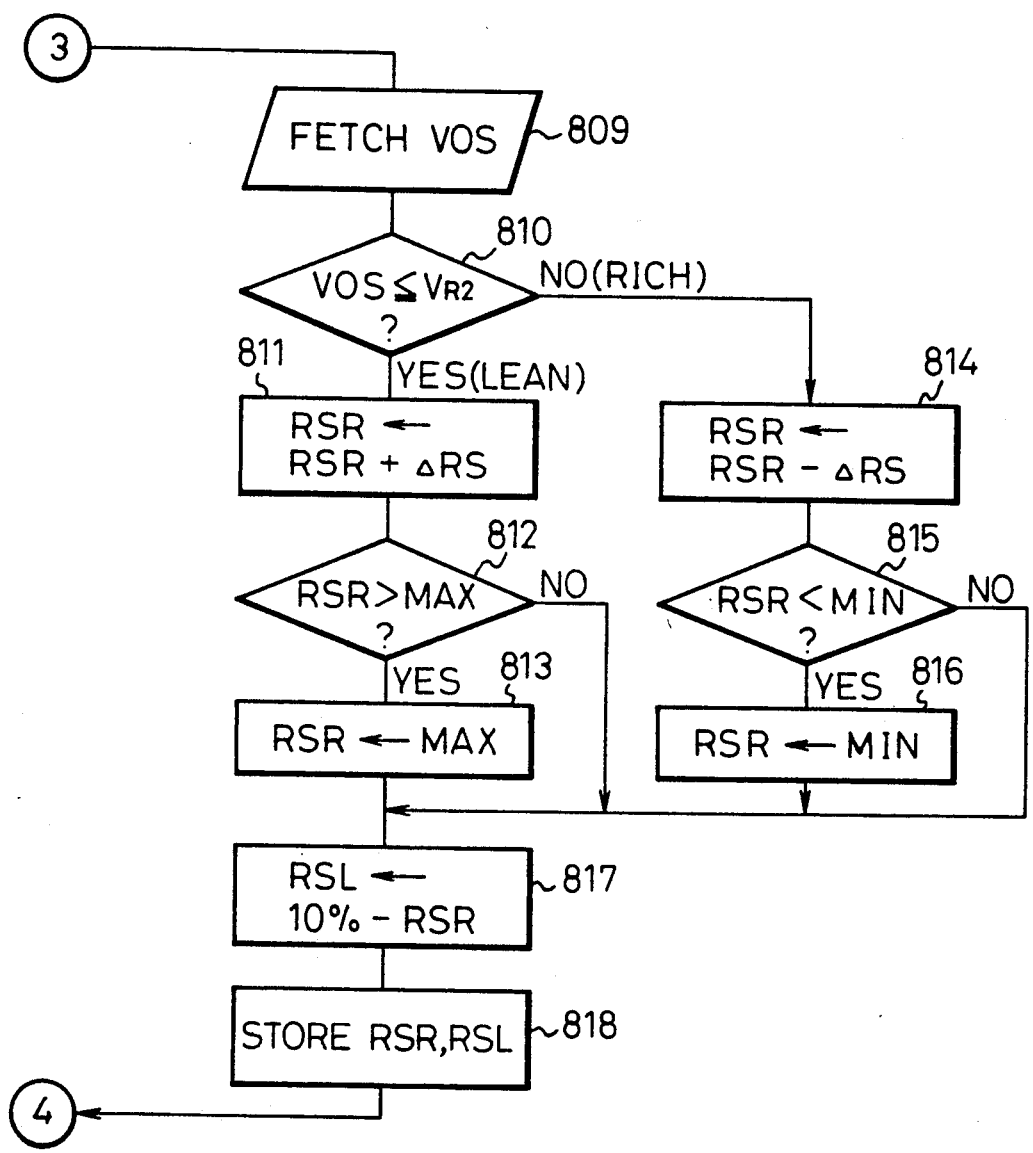

FIGS. 8A and 8B show a flow chart of the control operation of the double O$_2$ sensor systems in which the skip amounts RSR, RSL are varied in accordance with the output VOS of the downstream O$_2$ sensor 15. This routine is executed at predetermined intervals such as 512 ms.

The steps from 801 to 806 of FIG. 8A show the operation for determining whether the conditions for executing the feedback control based on the output of the downstream O$_2$ sensor 15 are satisfied.

These conditions are,
the conditions for executing the air-fuel ratio feedback control based on the outputs of the upstream O$_2$ sensor 13 are satisfied (the air-fuel ratio feedback control flag XMFB = "1" at step 801),
the temperature THW of the coolant is higher than a predetermined value (e.g., 70° C.) (step 802),
the throttle valve 16 is not fully closed (i.e., the signal LL is not ON), (step 803),
the secondary air AS is not introduced in to the exhaust manifold (step 804),
the load of the engine represented by Q/N is more than a predetermined value X$_1$ (i.e., Q/N$_e$ ≧ X$_1$), (step 805),
the downstream O$_2$ sensor 15 is activated (step 806).
If any one of these conditions is not satisfied, the routine proceeds to step 819 in which an air-fuel ratio feedback control operation flag XSFB is reset (= "0").

If all of the conditions of steps 801 to 806 are satisfied, the flag XSFB is set (= "0") at step 808, and the routine proceeds to step 809 of FIG. 8B.

The steps 809 through 818 illustrate the operation for calculating the skip amounts RSR or RSL in accordance with the output VOS of the downstream O$_2$ sensor 15.

At step 809, an A/D conversion is performed on the output voltage VOS of the downstream O$_2$ sensor 15, and the A/D converted value thereof is then fetched from the A/D converter 101. Then, at step 810, the voltage VOS is compared with a reference voltage V$_{R2}$ such as 0.55 V, to thereby determine whether the current air-fuel ratio detected by the downstream O$_2$ sensor 15 is on the rich side or on the lean side with respect to the stoichiometric air-fuel ratio. Note that the reference voltage V$_{R2}$ (= 0.55 V) is preferably higher than the reference voltage V$_{R1}$ (= 0.45 V), in consideration of the difference in output characteristics and deterioration speed between the O$_2$ sensor 13 upstream of the catalytic converters and the O$_2$ sensor 15 downstream of the catalytic converters.

If VOS ≦ V$_{R2}$ (lean state) at step 810, then the routine proceeds to steps 811 to 813, and if VOS > V$_{R2}$ (rich state), the routine proceeds to steps 814 to 816. Namely, at step 811, the rich skip amount RSR is increased by ΔRS (constant value), to thereby shift the air-fuel ratio to the rich side. Then at steps 812 and 813, the skip amount RSR is guarded by a maximum value MAX (e.g., approximately 7.5%). On the other hand, at step 814, the rich skip amount is decreased by ΔRS, to thereby shift the air-fuel ratio to the lean side. Then, at steps 815 and 816, the rich skip amount RSR is guarded by a minimum value MIN (e.g., approximately 2.5%). The maximum value MAX is selected so that the amount of change of the air-fuel ratio is maintained within a range which does not worsen drivability, and the minimum value MIN is selected so that the response of the control in a transient condition is not worsened.

At step 817, the lean skip amount RSL is calculated by

RSL ← 10% − RSR.

Namely, a sum of RSR and RSL is maintained at 10%. Then at step 818, the skip amounts RSR and RSL are stored in the backup RAM 106, and the routine terminates at step 820 in FIG. 8A.

Figure 9:
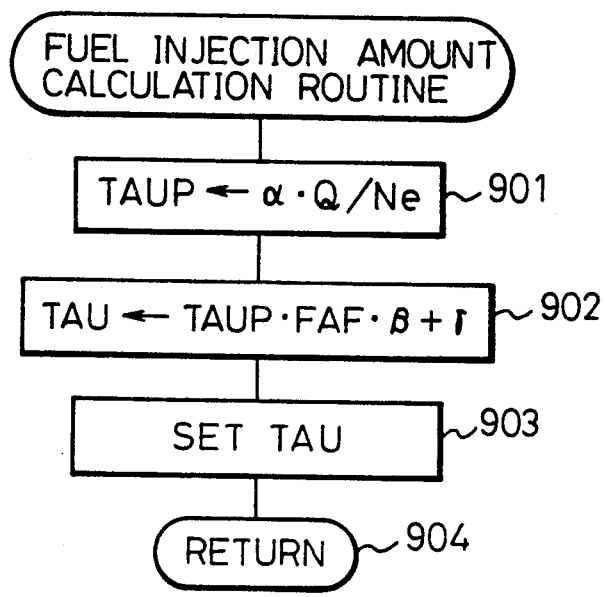

FIG. 9 shows a routine for calculating the fuel injection amount using the air-fuel ratio correction factor FAF calculated by the routine of FIGS. 6A and 6B.

At step 901, a basic fuel injection amount TAUP is calculated in accordance with the amount of the intake air per one revolution of the engine, Q/N$_e$, by TAUP ← α·Q/N$_e$ where, TAUP is the fuel injection amount required to obtain the stoichiometric air-fuel ratio and α is a predetermined constant.

Then, at step 902, a fuel injection amount TAU is calculated by

TAU ← TAUP·FAF·β + γ where, β and γ are correction factors determined by operating conditions of the engine. The calculated TAU is set to the down counter 108 and a flip-flop 109 is set at step 903, whereby fuel injection is started.

As stated before, when the time corresponding to TAU has lapsed, the flip-flop 109 is reset by the signal from the down counter 108, whereby the fuel injection is terminated.

Figure 10A:
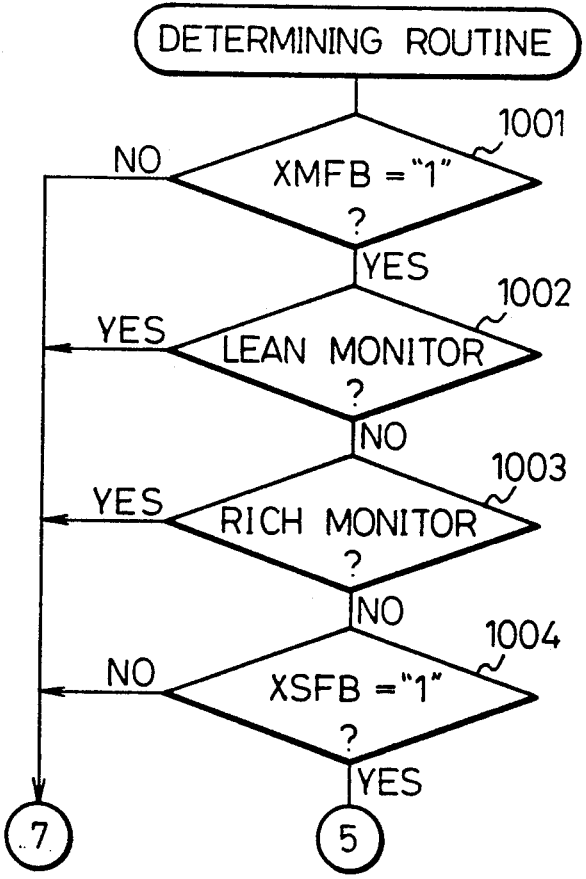
Figure 10B:
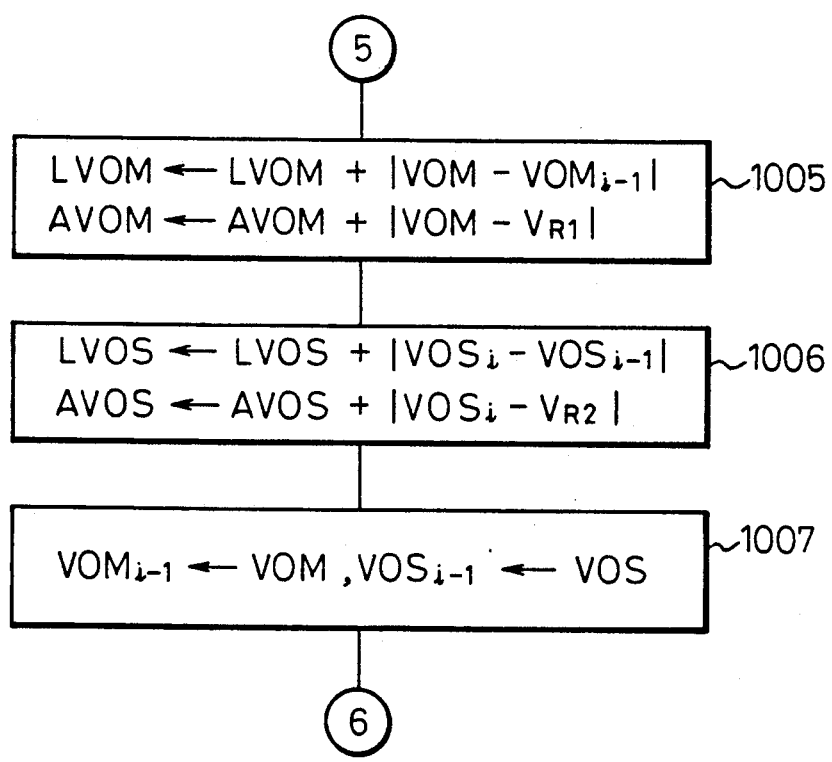
Figure 10C:
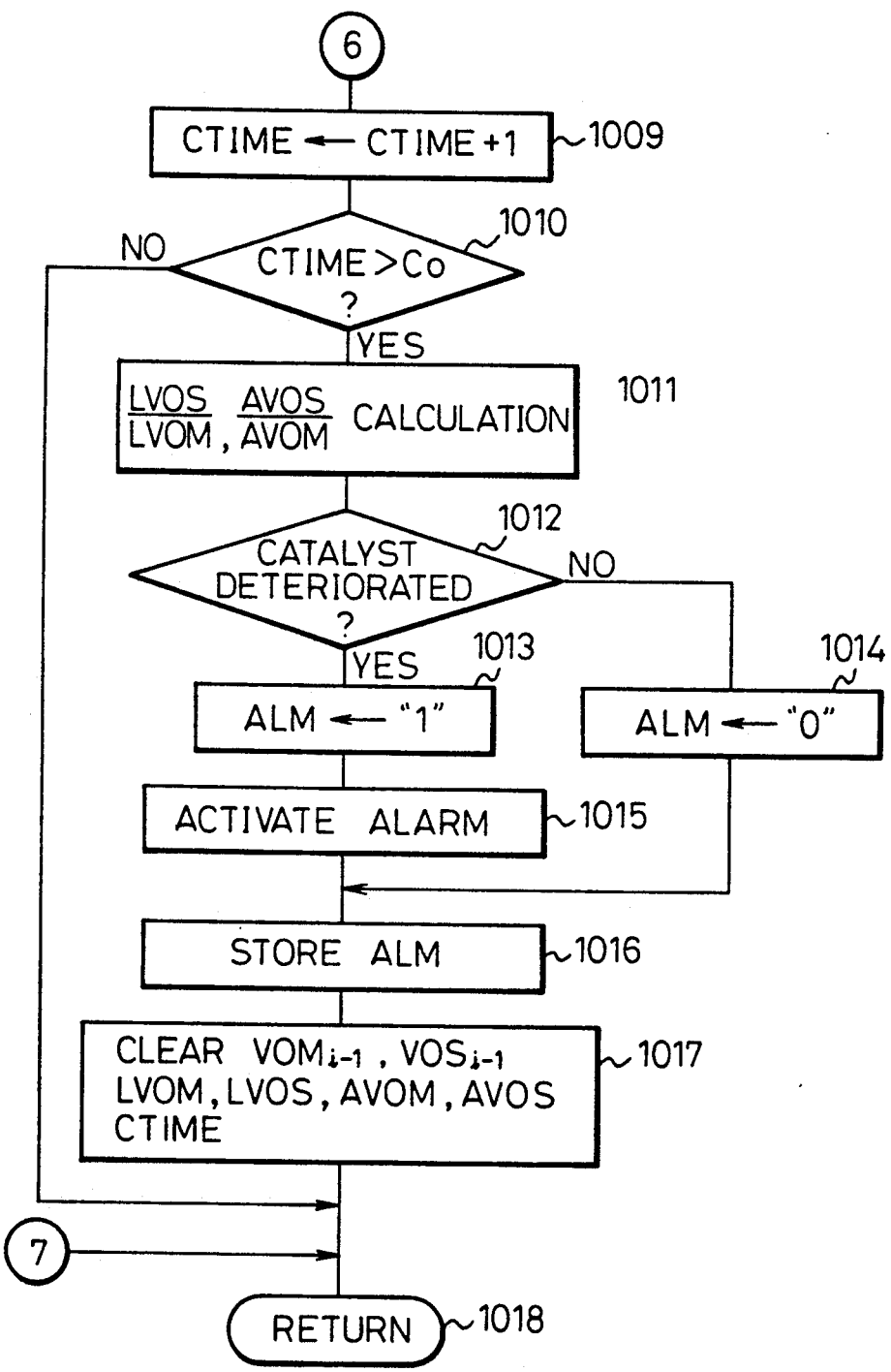

FIGS. 10A to 10C show the routine for determining whether or not the catalytic converter 12 has deteriorated. This routine is executed by the control circuit 10 at predetermined intervals such as 4 ms.

When the routine is started, it is determined at step 1001 in FIG. 10A, whether or not the air-fuel ratio feedback control based on the output VOM of the upstream $O_2$ sensor 13 is being carried out, by determining the value of the flag XMFB. If the feedback control is being carried out (i.e., XMFB="1" at step 1001), it is determined whether or not a lean side condition or a rich side condition of the output VOM of the upstream $O_2$ sensor is being maintained at more than a predetermined time by a lean monitor at step 1002 and a rich monitor at step 1003. And at step 1004 it is determined whether or not the air-fuel ratio feedback control based on the carried out, by determining the value of the flag XSFB.

The determination of the deterioration of the catalyst (steps 1005 to 1017) is carried out only when the air-fuel ratio feedback control based on both VOM and VOS is carried out (XMFB="1" at step 1001 and XSFB="1" at step 1004), and the output VOM of the upstream $O_2$ sensor 13 is not staying at the lean side nor the rich side for more than a predetermined time (steps 1002 and 1003).

The reason why the lean monitor (step 1002) and the rich monitor (step 1003) is required is, because if the output VOM stays on the lean side or rich side (i.e., if the response curve of the output VOM does not intersect the reference voltage line), the values of LVOM and AVOM are not calculated effectively. Namely, the determination of the deterioration of the catalyst is carried out only when the shape of the response curve of the output VOM is similar to the response curve shown in FIG. 3(A).

At step 1005 in FIG. 10B, the length LVOM and the area AVOM of the output response curve of the upstream $O_2$ sensor are calculated by;

$$LVOM = LVOM + |VOM - VOM_{i-1}|$$

$$AVOM = AVOM + |VOM - V_{R1}|$$

Figure 11:
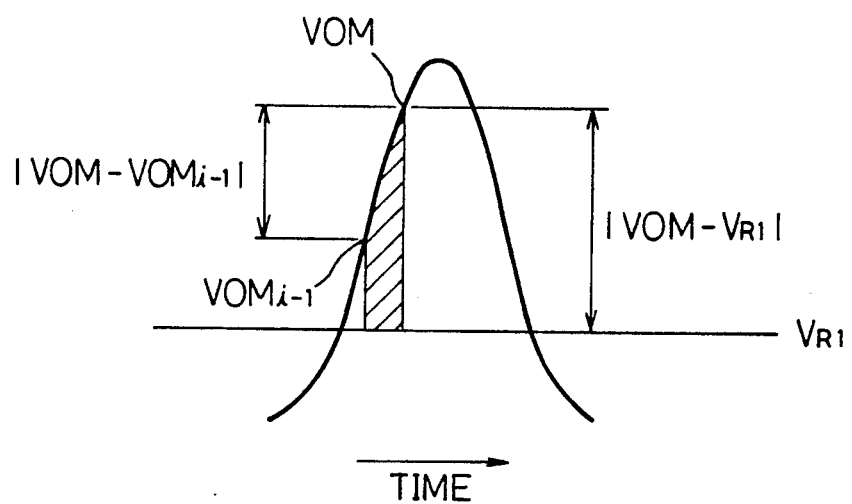
FIG. 11 is a diagram explaining the length LVOM and the area AVOM of the output response curve of the upstream $O_2$ sensor.

In the above calculation, $VOM_{i-1}$ is the value of the output VOM when the routine was last executed. In this embodiment, as schematically shown in FIG. 11, the value $|VOM - VOM_{i-1}|$ corresponds to the length of a fragment of the response curve of the output VOM corresponding to the interval of the execution of the routine, and the value $|VOM - V_{R1}|$ corresponds to the area surrounded by said fragment and the reference voltage line (shown by a hatched area in FIG. 11). Note that, the sampling interval between $VOM_{i-1}$ and VOM is shown much longer than the actual interval, compared with the oscillation period of the output in FIG. 11. Also, note that the length LVOM and the area AVOM can be calculated more precisely by considering the shape of the response curve.

At step 1006, the length LVOS and the area AVOS of the output response curve of the downstream $O_2$ sensor are calculated similarly by;

$$LVOS = LVOS + |VOS - VOS_{i-1}|$$

$$AVOS = AVOS + |VOS - V_{R2}|$$

where, the value $VOS_{i-1}$ is the value of output VOS when the routine was last executed.

After calculating LVOM, AVOM and LVOS, AVOS, at step 1007, the values $VOM_{i-1}$ and $VOS_{i-1}$ are renewed to prepare for the next execution of the routine.

Then, at step 1009, the counter CTIME is increased by 1 and at step 1010, it is determined whether or not the value of the counter CTIME exceeds a predetermined value Co. Where, the value Co is the count of the execution of the routine corresponding to 40 reversals of the output VOM of the upstream $O_2$ sensor 13 (i.e., corresponds to approximately 20 seconds in this embodiment).

Instead of counting the number of executions of the routine by the counter CTIME, the number of the reversals of the output VOM of the upstream $O_2$ sensor may be counted directly.

If CTIME > Co at step 1010, the routine proceeds to step 1011 in which the ratio of the lengths and the areas of the output response curves of the upstream and downstream $O_2$ sensors (LVOS/LVOM and AVOS/AVOM respectively) are calculated.

Then, at step 1012, determination of the deterioration of the catalyst is carried out based on the values of the ratios LVOS/LVOM and AVOS/AVOM.

Figure 12A:
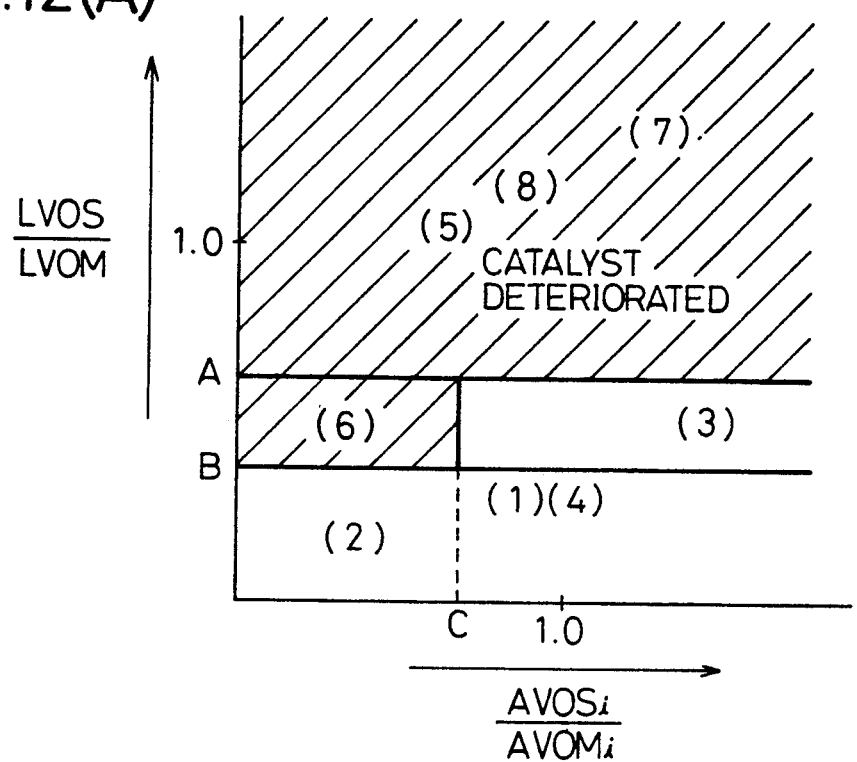
FIGS. 12A-12C show examples of the map used for the determination of the deterioration of the catalyst according to the present invention.

In this embodiment, the determination of the deterioration of the catalyst is carried out using the map shown in FIG. 12(A) or (B). The map shown in FIG. 12(A) or (B) is stored in ROM 104 of the control circuit in the form of a numeral table.

Figure 12B:
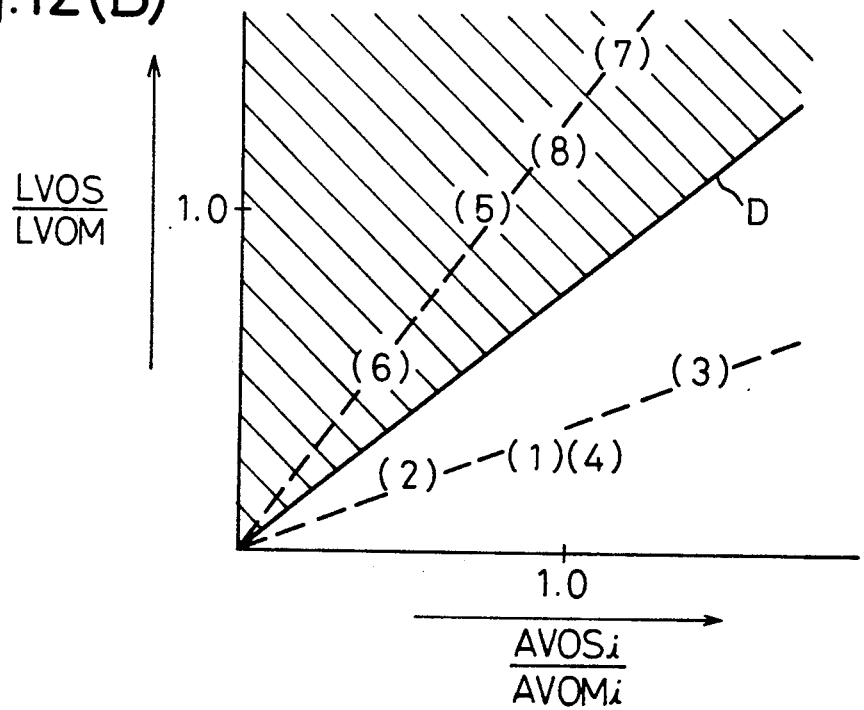

In FIGS. 12(A), 12(B), the hatched area indicates the area in which the catalyst is determined to be deteriorated.

Referring to FIG. 12(A), when the ratio LVOS/LVOM is larger than a predetermined value A, it is determined that the catalyst has deteriorated, and when the ratio LVOS/LVOM is smaller than a predetermined value B, it is determined that the catalyst is not deteriorated. If the ratio LVOS/LVOM is between A and B, the catalyst is determined to be deteriorated only when the ratio AVOS/AVOM is smaller than a predetermined value C, and otherwise the catalyst is determined to be normal.

Actually, the values A, B, C are selected in accordance with the types of the catalyst and the air-fuel ratio sensors, and A, B, C in FIG. 12(A) show only general tendencies.

Alternatively, the determination of the deterioration of the catalyst can be carried out in accordance with the map shown in FIG. 12(B). Referring to FIG. 12(B), it is determined that the catalyst is deteriorated when the values LVOS/LVOM and AVOS/AVOM fall in the area above a threshold line represented by straight line D in FIG. 12(B).

The points (1)–(8) indicated in FIG. 12(A) and (B) correspond to the conditions (1)–(8) in FIGS. 1 and 2. As seen from FIG. 12(A) and (B), even in the cases (3) and (6), in which the ratio LVOS/LVOM takes nearly the same value, the deterioration of the catalyst can be determined accurately by the value of the ratio AVOS/AVOM.

Figure 12C:
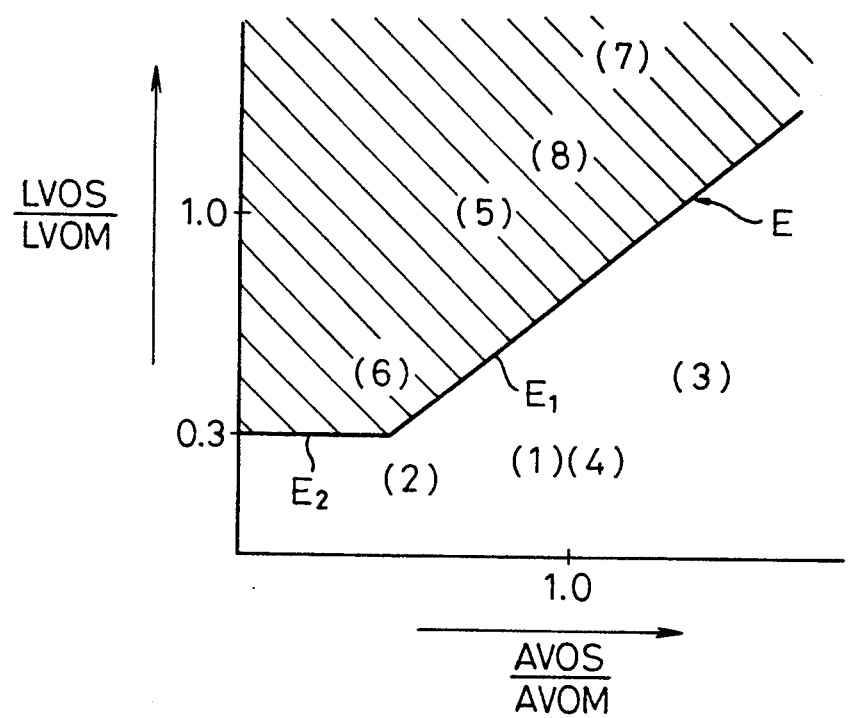

Also, the determination of the deterioration of the catalyst can be carried out in accordance with the map shown in FIG. 12(c) alternatively. Referring to FIG. 12(c), the threshold line D in FIG. 12(B) is replaced by the line E which is the combination of two straight lines $E_1$ and $E_2$. When the center value of the air-fuel ratio which is feedback controlled is very close to the stoichiometric air-fuel ratio and the amplitude of the oscillation of the air-fuel ratio becomes small while controlled, both AVOS and LVOS may become very small with normal catalytic converter. In this case, if the deterioration of the catalyst is carried out in accordance with the map shown in FIG. 12(b), the normal catalyst might be determined as deteriorated. By using the map shown in FIG. 12(c), the deterioration of the catalyst can be determined accurately even in this case.

Note that if the engine operating condition is in a certain range, it is actually possible to determine the deterioration of the catalyst based on the values AVOS and LVOS instead of the ratios AVOS/AVOM and LVOS/LVOM.

Also, AVOS/AC and LVOS/LC can be used in the above steps for determining the deterioration of the catalyst, where AC and LC are variables which become larger as the engine operating load increases and determined by the operating conditions of the engine. (In other words, the variables AC and LC are proportional to the values of ALVOM and LVOM respectively.

Returning to FIG. 10C, if it is determined that the catalyst has deteriorated at step 1012, the routine proceeds to step 1013, which causes an alarm flag ALM to be "1". Then, the alarm 19 in FIG. 5 is activated at step 1015 to warn the driver that the catalyst has deteriorated. If it is not determined that the catalyst has deteriorated, the alarm flag ALM is reset ($=$"0") at step 1014.

In both cases, the value of the alarm flag ALM is stored in the backup RAM 106 of the control circuit 10 to prepare for future maintenance and inspection.

After executing the above steps, the parameters LVOM, AVOM, LVOS, AVOS and CTIME are cleared at step 1017 to prepare for a next determining operation, and the routine is then terminated at step 1018.

In the double $O_2$ sensor system explained above, the feedback control based on the upstream $O_2$ sensor is carried out every 4 ms, while the feedback control based on the downstream $O_2$ sensor is carried every 512 ms. This is to control the air-fuel ratio of the engine mainly by the upstream $O_2$ sensor so that a good response of the control is assured, and to use the downstream $O_2$ sensor which has a relatively lower response for only compensating the individual difference or change of the characteristics of the upstream $O_2$ sensor.

The present invention also can be applied to other type double $O_2$ sensor systems in which other control parameters of the feedback control based on the upstream $O_2$ sensor, such as delay times TDR and TDL, the integration amounts KIR and KIL, etc., are variable or, in which the second air-fuel ratio correction factor FAF2 is introduced.

Also, in the present invention it is possible to fix the value of either one of the skip amounts RSR and RSL (or the delay times TDR and TDL or the integration amounts KIR and KIL) and to vary the other.

Further, though the air-fuel ratio feedback control in the above embodiment is carried out based on the outputs of both the upstream and downstream $O_2$ sensors, the present invention can also be applied to a double $O_2$ sensor system in which the air-fuel ratio feedback control is carried out based on the output of the upstream $O_2$ sensor only. In this case, the downstream $O_2$ sensor is used only to determine the deterioration of the catalyst.

Also, in the above embodiment, the amount of the fuel injected to the engine is calculated in accordance with the amount of the intake air and the engine speed. However, the present invention can be applied to a system in which the amount of the fuel injection is calculated in accordance with the inlet manifold pressure and the engine speed, or the degree of opening of the throttle valve and the engine speed, etc. Further, instead of the potentiometer-type air flow meter of the above embodiment, a Karman vortex type or heat wire type air flow meter can be used equally well.

Further, the present invention can be applied to a fuel system other than the fuel injection system. For example, a carburetor type fuel system in which the air-fuel ratio is adjusted by controlling the amount of the inlet air by an electric air control valve (EACV), or by controlling the amount of the bleed air of the carburetor to adjust the amount of the atmospheric air introduced into the main system and the slow speed system of the carburetor. In these cases, the basic fuel amount corresponding to TAUP of the step 901 in FIG. 9 is determined by the carburetor itself in accordance with the inlet manifold pressure and the engine speed, and the amount of the inlet air supplied to the engine is calculated in accordance with the fuel injection amount TAU of the step 902 in FIG. 9.

Also, in the above embodiment, $O_2$ sensors are used for air-fuel ratio sensors, but other types of sensors, such as lean mixture sensors or CO sensors, also can be used as the air-fuel ratio sensors in the present invention. If a $T_iO_2$ sensor is used for the air-fuel ratio sensor, the control response of the system is largely improved, whereby an over compensation by the downstream air-fuel ratio sensor can be effectively prevented.

Further, in the above embodiment, a microcomputer, i.e., a digital circuit is used for the control circuit, but an analog circuit can be used equally well for the control circuit of the present invention.

We claim:

1. A device for determining a deterioration of a three-way catalyst disposed in an exhaust passage of an internal combustion engine, said engine comprising, an upstream air-fuel ratio sensor disposed in the exhaust passage upstream of said three-way catalyst for detecting an air-fuel ratio of the exhaust gas upstream of said three-way catalyst, a downstream air-fuel ratio sensor disposed in the exhaust passage downstream of said three-way catalyst for detecting an air-fuel ratio of the exhaust gas downstream of said three-way catalyst, and a feedback control means for controlling the air-fuel ratio of the engine by a feedback control based on, at least, the output of said upstream air-fuel ratio sensor, said device comprising:

a first characteristic value obtaining means for obtaining first characteristic values of the outputs of said upstream and downstream air-fuel ratio sensors, respectively, when the engine is controlled by said feedback control means;

a second characteristic value obtaining means for obtaining second characteristic values of the outputs of said upstream and downstream air-fuel ratio sensors, respectively, when the engine is controlled by said feedback control means; and, a determining means for determining for a given time period whether or not said three-way catalyst has deteriorated by comparing said first characteristic values and said second characteristic values.

2. A device according to claim 1, wherein said determining means compares said first characteristic values of said upstream and downstream air-fuel ratio sensors, and compares said second characteristic values of said upstream and downstream air-fuel ratio sensors, respectively, and determines whether or not said three-way catalyst has deteriorated based on the results of both said comparisons.

3. A device according to claim 1, wherein said first characteristic value obtained by said first characteristic value obtaining means corresponds to the length of the output response curve of the air-fuel ratio sensor.

4. A device according to claim 1, wherein said second characteristic value obtained by said second characteristic value obtaining means corresponds to the area surrounded by the output response curve and a reference line of the air-fuel ratio sensor.

5. A device for determining a deterioration of a three-way catalyst disposed in an exhaust passage of an internal combustion engine, said engine comprising, an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, a feedback control means for controlling the air-fuel ratio of the engine by a feedback control based on, at least, the output signal of said upstream air-fuel ratio sensor, said device comprising:
- a means for calculating the lengths of the output signal response curves of said upstream and downstream air-fuel ratio sensors, respectively, when the engine is controlled by said feedback control means;
- a means for calculating the areas surrounded by the output signal response curves and reference lines of said upstream and downstream air-fuel ratio sensors when the engine is controlled by said feedback control means; and,
- a determining means for determining for a given time period whether or not said three-way catalyst has deteriorated in accordance with said lengths of the output signal response curves of the upstream and downstream air-fuel ratio sensors and said areas surrounded by the output signal response curves and reference lines of the upstream and downstream air-fuel ratio sensors.

6. A device according to claim 5, wherein said determining means comprises, a means for calculating the ratio of said length of the output signal response curve of the downstream air-fuel ratio sensor to said length of the output signal response curve of the upstream air-fuel ratio sensor, a means for calculating the ratio of said area of the output signal response curve of the downstream air-fuel ratio sensor to said area of the output signal response curve of the upstream air-fuel ratio sensor, and a means for determining that the catalyst has deteriorated when the relationship between the values of said ratio of the lengths and said ratio of the areas satisfy predetermined conditions.

7. A device according to claim 6, wherein said determining means determines that the catalyst has deteriorated when the value of said ratio of the lengths is larger than or equal to a predetermined first value, or when the value of said ratio of the lengths is smaller than said first value but larger than a predetermined second value while the value of said ratio of the areas is smaller than or equal to a predetermined third value.

8. A device according to claim 6, wherein said determining means determines that the catalyst has deteriorated when a ratio of the value of said ratio of the lengths to the value of said ratio of the areas is larger than a predetermined value.

9. A device according to claim 6, wherein said determining means determines that the catalyst has deteriorated when:
a) a ratio of the value of said ratio of the lengths to the value of said ratio of said areas is larger than a first value; and,
b) said ratio of the lengths is larger than a second value.

10. A device for determining a deterioration of a three-way catalyst disposed in an exhaust passage of an internal combustion engine, said engine comprising, a downstream air-fuel ratio sensor disposed in the exhaust passage downstream of said three-way catalyst for detecting an air-fuel ratio of the exhaust gas downstream of said three-way catalyst, and a feedback control means for controlling the air-furl ratio of the gas upstream of said three-way catalyst by a feedback control so that the air-fuel ratio oscillates around the stoichiometric air-fuel ratio, said device comprising:
- a means for obtaining a length of the output signal response curve of said downstream air-fuel ratio sensor when the air-fuel ratio is controlled by said feedback control means;
- a means for obtaining an area surrounded by the output signal response curve of said downstream air-furl ratio sensor and a reference value when the air-fuel ratio is controlled by said feedback control means; and,
- a determining means for determining for a given time period whether or not said three-way catalyst has deteriorated in accordance with both said length and said area.

11. A method for determining a deterioration of a three-way catalyst disposed in an exhaust passage of an internal combustion engine having an upstream air-fuel ratio sensor disposed in the exhaust passage upstream of said three-way catalyst for detecting an air-fuel ratio of the exhaust gas upstream of said three-way catalyst, a downstream air-fuel ratio sensor disposed in the exhaust passage downstream of said three-way catalyst for detecting an air-fuel ratio of the exhaust gas downstream of said three-way catalyst, and a feedback control means for controlling the air-fuel ratio of the engine by a feedback control based on, at least, the output of said upstream air-fuel ratio sensor, said method comprising the steps of:
- obtaining first characteristic values of the outputs of said upstream and downstream air-fuel ratio sensors respectively, when the engine is controlled by said feedback control means;
- obtaining second characteristic values of the outputs of said upstream and downstream air-fuel ratio sensors, respectively, when the engine is controlled by said feedback control means; and, determining for a given time period whether or not said three-way catalyst has deteriorated by comparing said first characteristic values and said second characteristic values.

12. A method according to claim 11, wherein said determining step comprises, a step of comparing said first characteristic values of said upstream and downstream air-fuel ratio sensors, a step of comparing said second characteristic values of said upstream and downstream air-fuel ratio sensors, and a step of determining whether or not said three-way catalyst has deteriorated based on the results of both said comparisons.

13. A method according to claim 11, wherein said first characteristic value corresponds to the length of the output signal response curve of the air-fuel ratio sensor.

14. A method according to claim 11, wherein said second characteristic value corresponds to the area surrounded by the output signal response curve and a reference line of the air-fuel ratio sensor.

15. A method for determining a deterioration of a three-way catalyst disposed in an exhaust passage of an internal combustion engine having an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, a feedback control means for controlling the air-fuel ratio of the engine by a feedback control based on, at least, the output signal of said upstream air-fuel ratio sensor, said method comprising the steps of:
    calculating the lengths of the output signal response curves of said upstream and downstream air-fuel ratio sensors when the engine is controlled by said feedback control means;
    calculating the areas surrounded by the output signal response curves and reference lines of said upstream and downstream air-fuel ratio sensors when the engine is controlled by said feedback control means; and,
    determining for a given time period whether or not said three-way catalyst has deteriorated in accordance with said lengths of the output signal response curves of the upstream and downstream air-fuel ratio sensors and said areas surrounded by the output signal response curves and reference lines of the upstream and downstream air-fuel ratio sensors.

16. A method according to claim 15, wherein said determining step comprises, a step of calculating the ratio of said length of the output signal response curve of the downstream air-fuel ratio sensor to said length of the output signal response curve of the upstream air-fuel ratio sensor, a step of calculating the ratio of said area of the output signal response curve of the downstream air-fuel ratio sensor to said area of the output signal response curve of the upstream air-fuel ratio sensor, and a step of determining that the catalyst has deteriorated when the relationship between the value of said ratio of the length and said ratio of the areas satisfy predetermined conditions.

17. A method according to claim 16, wherein said step of determining that the catalyst has deteriorated comprises a step for determining that the catalyst has deteriorated when the value of said ratio of the lengths is larger than or equal to a predetermined first value, and when the value of said ratio of the lengths is smaller than said first value but larger than a predetermined second value while the value of said ratio of the area is smaller than or equal to a predetermined third value.

18. A method according to claim 16, wherein said step of determining that the catalyst has deteriorated comprises a step for determining that the catalyst has deteriorated when a ratio of the value of said ratio of the lengths to the value of said ratio of the areas is larger than a predetermined value.

19. A method according to claim 16, wherein said step of determining that the catalyst has deteriorated comprises a step for determining that the catalyst has deteriorated when:
    a) a ratio of the value of said ratio of the lengths to the value of said ratio of said areas is larger than a first value; and,
    b) said ratio of the lengths is larger than a second value.

20. A method for determining a deterioration of a three-way catalyst disposed in an exhaust passage of an internal combustion engine having a downstream air-fuel ratio sensor disposed in the exhaust passage downstream of said three-way catalyst, and a feedback control means for controlling the air-fuel ratio of the gas upstream of said three-way catalyst by a feedback control so that the air-fuel ratio oscillates around the stoichiometric air-fuel ratio, said method comprising the steps of:
    obtaining a length of the output signal response curve of said downstream air-fuel ratio sensor when the air-fuel ratio is controlled by said feedback control means;
    obtaining an area surrounded by the output signal response curve of said downstream air-fuel ratio sensor and a reference value when the air-fuel ratio is controlled by said feedback control means; and
    determining for a given time period whether or not said three-way catalyst has deteriorated in accordance with both said length and said area.

* * * * *